Oct. 17, 1944. B. SCHROETER 2,360,370
SELF-LUBRICATING BEARING
Filed Sept. 29, 1941 2 Sheets-Sheet 1
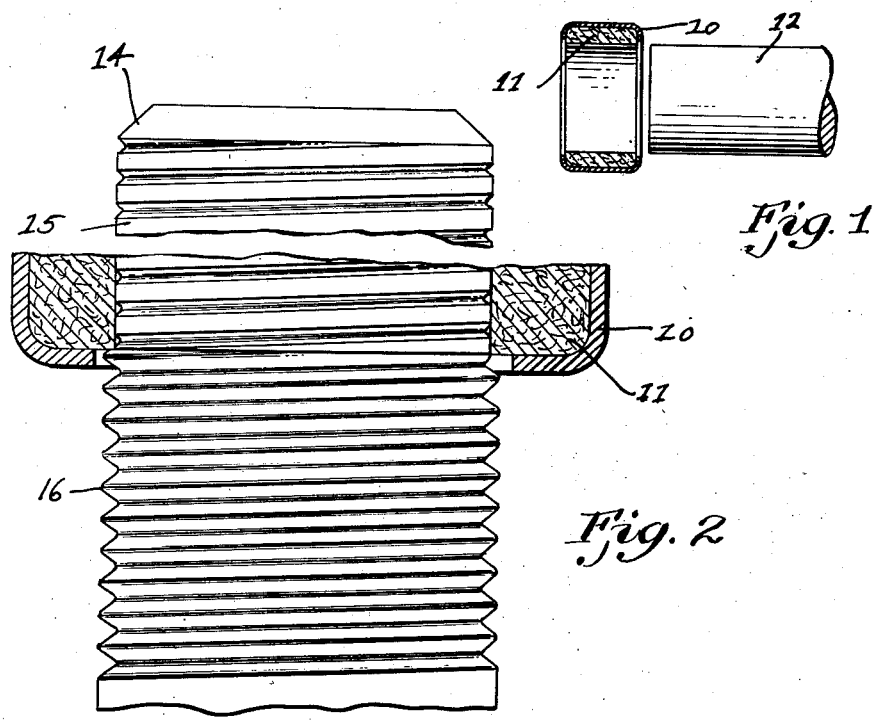
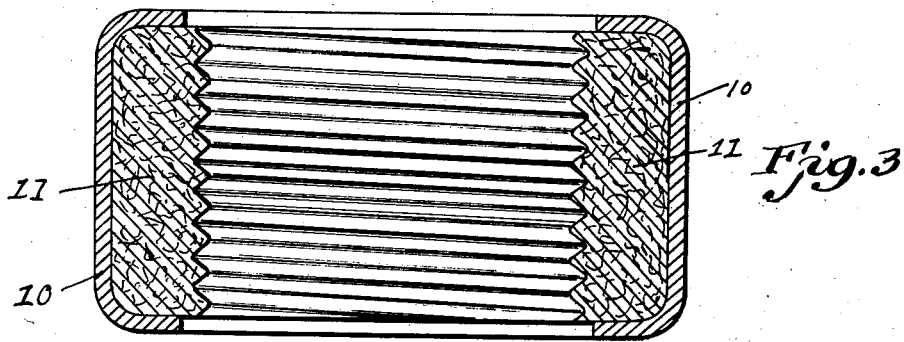
INVENTOR.
BRUNO SCHROETER
BY Barnes, Kisselle, Laughlin & Raisch
Attorneys.

Oct. 17, 1944.      B. SCHROETER      2,360,370
SELF-LUBRICATING BEARING
Filed Sept. 29, 1941      2 Sheets-Sheet 2

INVENTOR.
BRUNO SCHROETER
BY Barnes, Kisselle, Laughlin, & Raisch
Attorneys.

Patented Oct. 17, 1944

2,360,370

UNITED STATES PATENT OFFICE 2,360,370

SELF-LUBRICATING BEARING

Bruno Schroeter, Detroit, Mich., assignor to O. & S. Bearing Company, Detroit, Mich., a corporation of Michigan Application September 29, 1941, Serial No. 412,702

4 Claims. (Cl. 308—120)

This invention relates to a self-lubricating bearing.

More specifically the invention relates to the method of forming and to the construction of a bearing in which a portion of the lubricant impregnated bearing material is pre-threaded. This facilitates assembly of the completed bearing and eliminates one of the parts which otherwise would have to be present. Reference is made to Patent No. 2,069,781, dated February 9, 1937, where the general type of bearing in question is fully described.

Another object of the invention relates to the construction of bearing brackets to cooperate with the pre-threaded bushing for rapid and easy assembly.

Other objects and features of the invention, relating to details of the method and construction, will be brought out in the following description and claims.

In the drawings:

Fig. 1 is a view of a bearing showing the self-lubricating material in position.

Fig. 2 illustrates a thread forming arbor.

Fig. 3 shows a threaded bushing within a casing.

Figure 4:
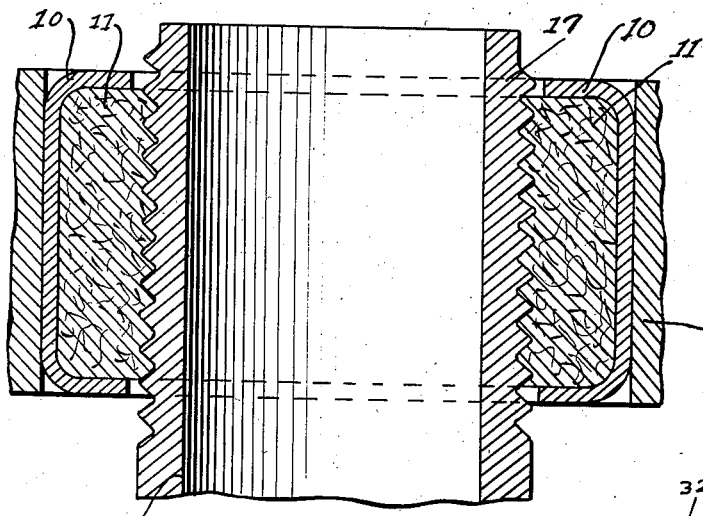
Fig. 4 shows an inner bearing member threaded into the bushing in the completed assembly of the bearing.

Referring to the drawings, in Fig. 1 an outer casing 10 has lubricant impregnated material 11 pressed therein as a lining for the cylindrical casing. A plug 12 is shown on which the combination 10 and 11 is to have what is called a hand-wring fit. In other words, the internal diameter of the lubricant impregnated material 11 is carefully regulated so that it may be placed on the plug 12 and turned by hand in a fairly tight fit. The bushing 10—11 is then threaded onto an arbor 14 having two types of threads; threads 15 are machined off so that their outside diameter is the same as plug 12 and the internal diameter of the bushing. The bushing is turned on to this machined end first, and, upon further turning, the threads 16 shape the lubricant impregnated material, as shown in Fig. 3.

Figure 6:
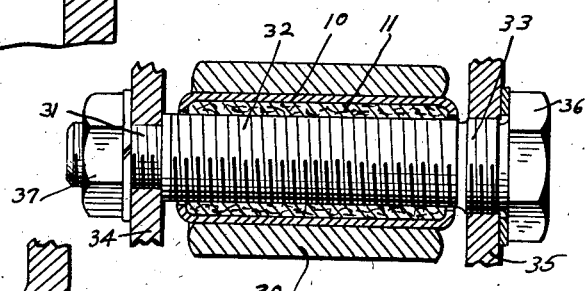
Fig. 6 illustrates another manner of forming the inner bearing member and its relation to the supporting bracket members.
Figure 5:
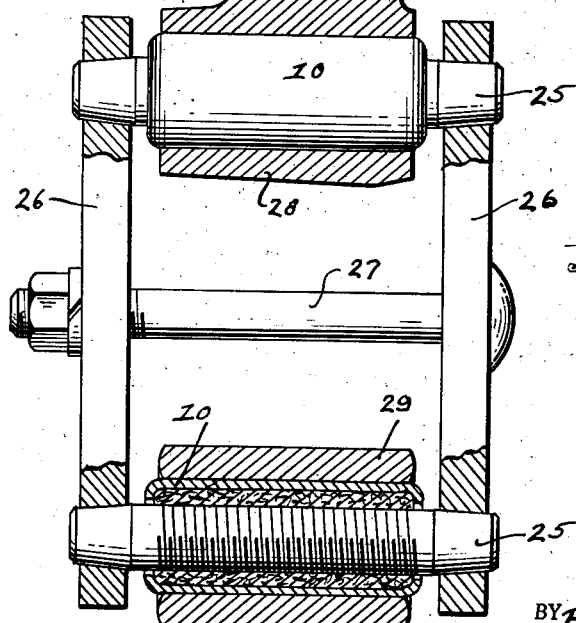
Fig. 5 illustrates a manner in which the completed bearing may be assembled in a spring bracket.

Fig. 4 illustrates the bushing 10—11 as assembled with an inner bearing member 17. The bushing is held in an outer bracket 18. The inner member 17 is provided with an axial hole in order that a bolt from a spring shackle or other attachment can be passed therethrough. Other constructions for utilizing the same bearing are shown in Figs. 5 and 6. In Fig. 5 the inner member 25 has each end tapered and adapted to be received in tapered holes in side plates 26. These plates are held together by a bolt 27. Members 28 and 29 are frame attaching members and spring shackle members, respectively.

In Fig. 6 the bushing is shown having a press fit in a spring shackle member 30 and the inner bearing member has three threaded portions of different diameters shown respectively at 31, 32 and 33. Connecting members 34 and 35 are provided and a head 36 is formed on the end of the inner member. All of the spring shackles 30 can be provided with the pre-threaded bushing during the production. In the assembly the spring shackle can be brought to position between the members 34 and 35 and the inner member may be threaded through the parts from one end to the other. The small threaded portion 31 cooperates with a threaded hole in the member 34 and is locked there by nut 37. The central threaded portion 32 comes to rest within the bushing 10—11 and provides the inner bearing member, while the larger threaded portion 33 cooperates with a threaded hole in member 35.

The biggest advantage of the pre-threaded bushing is that it may be press fitted into the particular part in which it will remain during the assembly or manufacture of such part. It is unnecessary to supply the inner bearing member until all the parts are assembled at which time the inner bearing member can be threaded in through the bushing and into its proper place in the assembly.

I claim:

1. The method of forming a self-lubricating bearing which comprises pressing a lubricant impregnated fibrous material into a cylindrical bracket, passing an arbor through said material to form a threaded bushing within the bracket, and assembling a threaded shaft into said bushing.

2. The method of forming a self-lubricating bearing which comprises pressing a lubricant impregnated fibrous material into a retaining bracket, threading an arbor through a substantially central opening in said material to form threads in said material, and threading a preformed shaft into said opening to complete assembly.

3. The method of forming a self-lubricating bearing which comprises pressing a lubricant impregnated fibrous material into a cylindrical bracket, regulating the inside dimension of said material, passing a threaded arbor through said material to form a threaded bushing, and assembling a threaded shaft into said bushing.

4. A pre-threaded, self-lubricating bearing comprising an outer enclosing bracket and a lubricant impregnated fibrous material lining for said bracket applied to said bracket under pressure and provided with a pre-threaded bushing opening therein adapted to receive a conforming threaded member when assembled.

BRUNO SCHROETER.